United States Patent
Inoue et al.

(10) Patent No.: US 7,699,729 B2
(45) Date of Patent: Apr. 20, 2010

(54) SPEED RATIO CHANGE CONTROL DEVICE AND METHOD FOR BELT TYPE CONTINUOUSLY VARIABLE TRANSMISSION

(75) Inventors: Takuichiro Inoue, Fujisawa (JP); Midori Yamaguchi, Yokohama (JP); Yoshihisa Kodama, Sagamihara (JP)

(73) Assignee: Jatco Ltd, Fuji-shi (JP)

( * ) Notice: Subject to any disclaimer, the term of this patent is extended or adjusted under 35 U.S.C. 154(b) by 82 days.

(21) Appl. No.: 11/953,916

(22) Filed: Dec. 11, 2007

(65) Prior Publication Data

US 2008/0146410 A1 Jun. 19, 2008

(30) Foreign Application Priority Data

Dec. 15, 2006 (JP) ............................. 2006-337958

(51) Int. Cl.
*F16H 61/662* (2006.01)
*F16H 61/00* (2006.01)
(52) U.S. Cl. .............................. 474/28; 474/18; 474/44; 477/44; 477/46; 701/51; 701/59; 701/60
(58) Field of Classification Search .................. 474/28, 474/14; *F16H 61/00, 61/662, 61/02*
See application file for complete search history.

(56) References Cited

U.S. PATENT DOCUMENTS

| 5,257,960 | A | 11/1993 | Sato | |
| 6,800,044 | B2* | 10/2004 | Inamura | ...................... 474/18 |
| 7,140,991 | B2 | 11/2006 | Sawada et al. | |
| 2003/0149520 | A1* | 8/2003 | Taniguchi et al. | .............. 701/59 |
| 2004/0127330 | A1* | 7/2004 | Sawada et al. | ................. 477/44 |
| 2004/0128046 | A1* | 7/2004 | Yamamoto et al. | ............ 701/51 |

FOREIGN PATENT DOCUMENTS

| JP | 04-171354 | A | | 6/1992 |
| JP | 11-082706 | A | | 3/1999 |
| JP | 2003-343711 | A | | 12/2003 |
| JP | 2003343711 | A | * | 12/2003 |
| JP | 2004-124965 | A | | 4/2004 |
| JP | 2004-360725 | A | | 12/2004 |
| JP | 2006-105174 | A | | 4/2006 |

OTHER PUBLICATIONS

U.S. Appl. No. 11/953,912, filed Dec. 11, 2007, Yamaguchi et al.

* cited by examiner

*Primary Examiner*—Robert A Siconolfi
*Assistant Examiner*—San Aung
(74) *Attorney, Agent, or Firm*—Foley & Lardner LLP

(57) ABSTRACT

This invention is a speed ratio change control device for a belt type continuously variable transmission that a minimum generated pressure of the primary pressure is estimated on the basis of a displacement speed of the movable sheave of the primary pulley and an opening area of a drain side passage of the speed ratio change control valve (S4), an upper limit value of a shift speed is calculated on the basis of the minimum generated pressure (S6), and the target speed ratio is set on the basis of the upper limit value of the shift speed (S10).

9 Claims, 5 Drawing Sheets

SPEED RATIO CHANGE CONTROL DEVICE AND METHOD FOR BELT TYPE CONTINUOUSLY VARIABLE TRANSMISSION

FIELD OF THE INVENTION

This invention relates to a speed ratio change control device for a belt type continuously variable transmission.

BACKGROUND OF THE INVENTION

JP2006-105174A published by the Japan Patent Office in 2006 discloses a belt type continuously variable transmission in which a link mechanism, one end of which is connected to a step motor and another end of which is connected to a movable sheave of a primary pulley, is connected to a speed ratio change control valve. The belt type continuously variable transmission controls a speed ratio by driving the speed ratio change control valve in accordance with the feed of the step motor and receiving feedback regarding an actual speed ratio in accordance with the displacement of the movable sheave.

SUMMARY OF THE INVENTION

When a vehicle equipped with a continuously variable transmission decelerates, the speed ratio must be shifted to a Low side in preparation for restart. However, when an attempt is made to shift the speed ratio to the Low side rapidly during rapid deceleration of the vehicle, the feed of the step motor, which is determined on the basis of a target speed ratio, increases, leading to an increase in a drain side opening of the speed ratio change control valve. There is a limit to the speed at which a primary pressure can be discharged through the drain, and therefore variation in the actual speed ratio slows, leading to an increase in the deviation between the actual speed ratio and the target speed ratio and a corresponding increase in a feedback correction amount. If the drain side opening of the speed ratio change control valve is kept at a maximum, the primary pressure may decrease excessively, causing belt slippage.

In a possible technique for preventing rapid decrease of the primary pressure, a sensor that detects the primary pressure is provided so that when the primary pressure falls to or below a predetermined pressure, the target speed ratio is set at a predetermined value at which the primary pressure becomes higher than the predetermined pressure and the feed of the step motor is held in a corresponding predetermined position. However, when the continuously variable transmission is not provided with a primary pressure sensor, belt slippage is unavoidable.

It is therefore an object of this invention to prevent belt slippage when a vehicle decelerates rapidly, without providing a primary pressure sensor.

In order to achieve the above object, this invention provides a speed ratio change control device for a belt type continuously variable transmission that comprises a continuously variable speed ratio change mechanism in which a belt is wrapped around a primary pulley and a secondary pulley and a speed ratio is varied by controlling a pressure supplied to each pulley to displace a movable sheave of each pulley, a speed ratio change control valve which controls a primary pressure serving as the pressure supplied to the primary pulley, and a link mechanism which moves the speed ratio change control valve to a position in which the primary pressure varies when a speed ratio change actuator moves to a position corresponding to a target speed ratio of the continuously variable speed ratio change mechanism, and returns the speed ratio change control valve to a position in which the primary pressure is maintained by varying the primary pressure such that the movable sheave of the primary pulley displaces. The device comprises a controller which estimates a minimum generated pressure of the primary pressure on the basis of a displacement speed of the movable sheave of the primary pulley and an opening area of a drain side passage of the speed ratio change control valve, which discharges the primary pressure, calculates an upper limit value of a shift speed of the continuously variable speed ratio change mechanism on the basis of the minimum generated pressure of the primary pressure; and sets the target speed ratio of the continuously variable speed ratio change mechanism on the basis of the upper limit value of the shift speed.

The details as well as other features and advantages of this invention are set forth in the remainder of the specification and are shown in the accompanying drawings.

DESCRIPTION OF THE PREFERRED EMBODIMENTS

An embodiment of this invention will be described in detail below with reference to the figures and so on.

Figure 1:
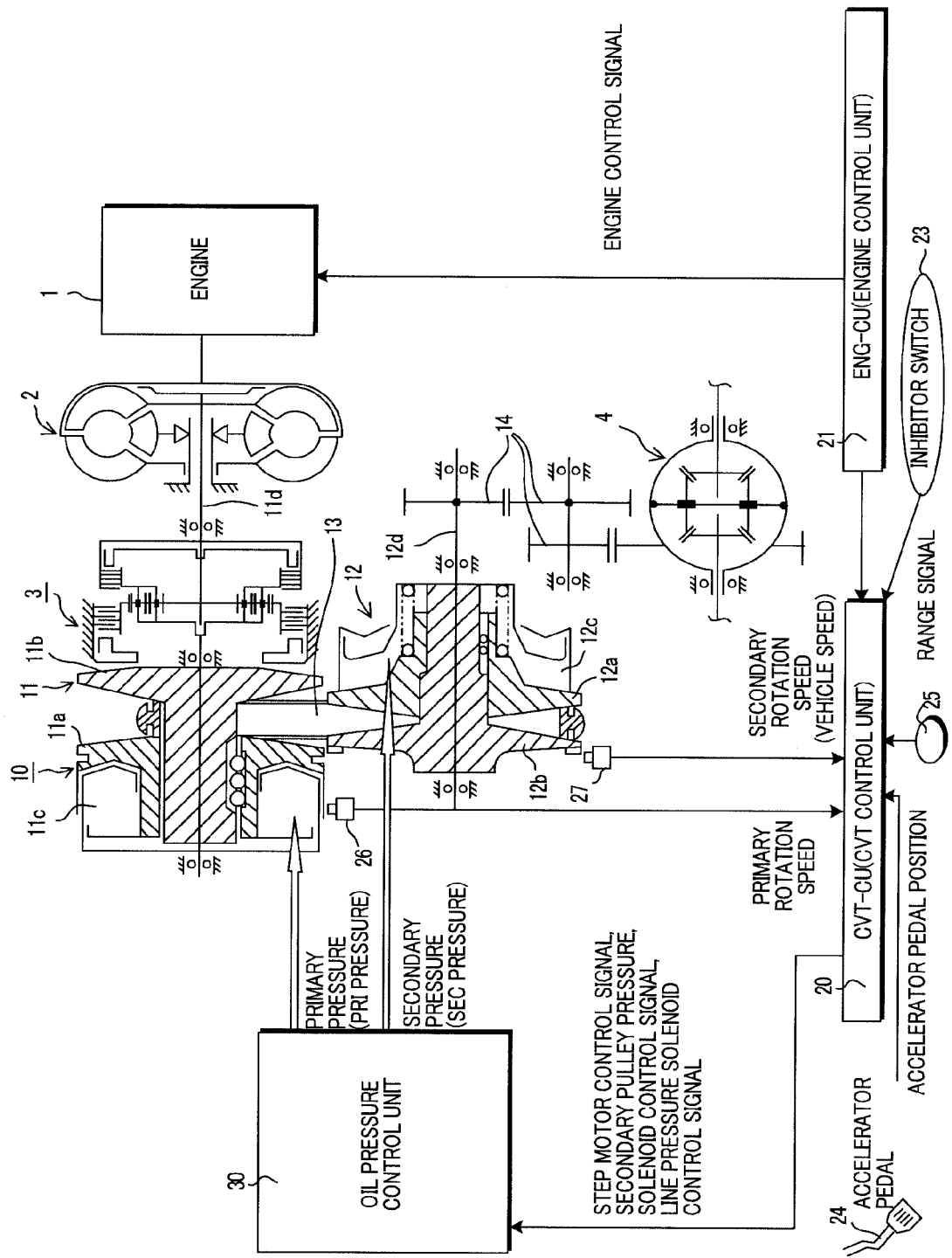
FIG. 1 is a schematic constitutional diagram showing a speed ratio change control device for a belt type continuously variable transmission according to an embodiment.

FIG. 1 is a schematic constitutional diagram showing a line pressure control device of a belt type continuously variable transmission according to this embodiment. A belt type continuously variable transmission 10 comprises a primary pulley 11, a secondary pulley 12, a V belt 13, a CVT control unit 20 (to be referred to as CVTCU hereafter), and an oil pressure control unit 30.

The primary pulley 11 is an input shaft side pulley which inputs the rotation of an engine 1 into the belt type continuously variable transmission 10. The primary pulley 11 comprises a fixed conical plate 11b which rotates integrally with an input shaft 11d, and a movable conical plate 11a which is disposed opposite the fixed conical plate 11b to form a V-shaped pulley groove, and which can be displaced axially by oil pressure acting on a primary pulley cylinder chamber 11c. The primary pulley 11 is connected to the engine 1 via a forward-reverse switching mechanism 3 and a torque converter 2 comprising a lockup clutch, and inputs the rotation of the engine 1. The rotation speed of the primary pulley 11 is detected by a primary pulley rotation speed sensor 26.

The V belt 13 is wrapped around the primary pulley 11 and secondary pulley 12 such that the rotation of the primary pulley 11 is transmitted to the secondary pulley 12.

The secondary pulley 12 outputs the rotation transmitted by the V belt 13 to a differential 4. The secondary pulley 12 comprises a fixed conical plate 12b which rotates integrally with an output shaft 12d, and a movable conical plate 12a which is disposed opposite the fixed conical plate 12b to form a V-shaped pulley groove, and which can be displaced axially in accordance with oil pressure acting on a secondary pulley cylinder chamber 12c. It should be noted that the pressure-receiving surface area of the secondary pulley cylinder chamber 12c is set substantially equally to the pressure-receiving surface area of the primary pulley cylinder chamber 11c.

The secondary pulley 12 is connected to the differential 4 via an idler gear 14 and an idler shaft, and outputs rotation to the differential 4. The rotation speed of the secondary pulley 12 is detected by a secondary pulley rotation speed sensor 27. The vehicle speed can be calculated from the rotation speed of the secondary pulley 12.

The CVTCU 20 determines the speed ratio and a contact frictional force on the basis of signals from an inhibitor switch 23, an accelerator pedal position sensor 24, an oil temperature sensor 25, the primary pulley rotation speed sensor 26, the secondary pulley rotation speed sensor 27, and so on, as well as input torque information from an engine control unit 21, and controls the belt type continuously variable transmission 10 by transmitting commands to the oil pressure control unit 30.

The oil pressure control unit 30 operates on the basis of the commands from the CVTCU 20. The oil pressure control unit 30 moves the movable conical plate 11a and the movable conical plate 12a in a rotary axis direction by controlling the oil pressure that is supplied to the primary pulley 11 and secondary pulley 12.

When the movable conical plate 11a and the movable conical plate 12a move, the pulley groove width varies, and as a result, the V belt 13 moves over the primary pulley 11 and secondary pulley 12. Thus, the contact radius between the V belt 13 and the primary pulley 11 and secondary pulley 12 varies, whereby the speed ratio and the contact frictional force of the V belt 13 are controlled.

The rotation of the engine 1 is input into the belt type continuously variable transmission 10 via the torque converter 2 and the forward-reverse switching mechanism 3 and transmitted from the primary pulley 11 to the differential 4 via the V belt 13 and secondary pulley 12.

When the accelerator pedal is depressed or a shift change is performed in a manual mode, the movable conical plate 11a of the primary pulley 11 and the movable conical plate 12a of the secondary pulley 12 are axially displaced, thereby varying the contact radius thereof with the V belt 13 such that the speed ratio is varied continuously.

Figure 2:
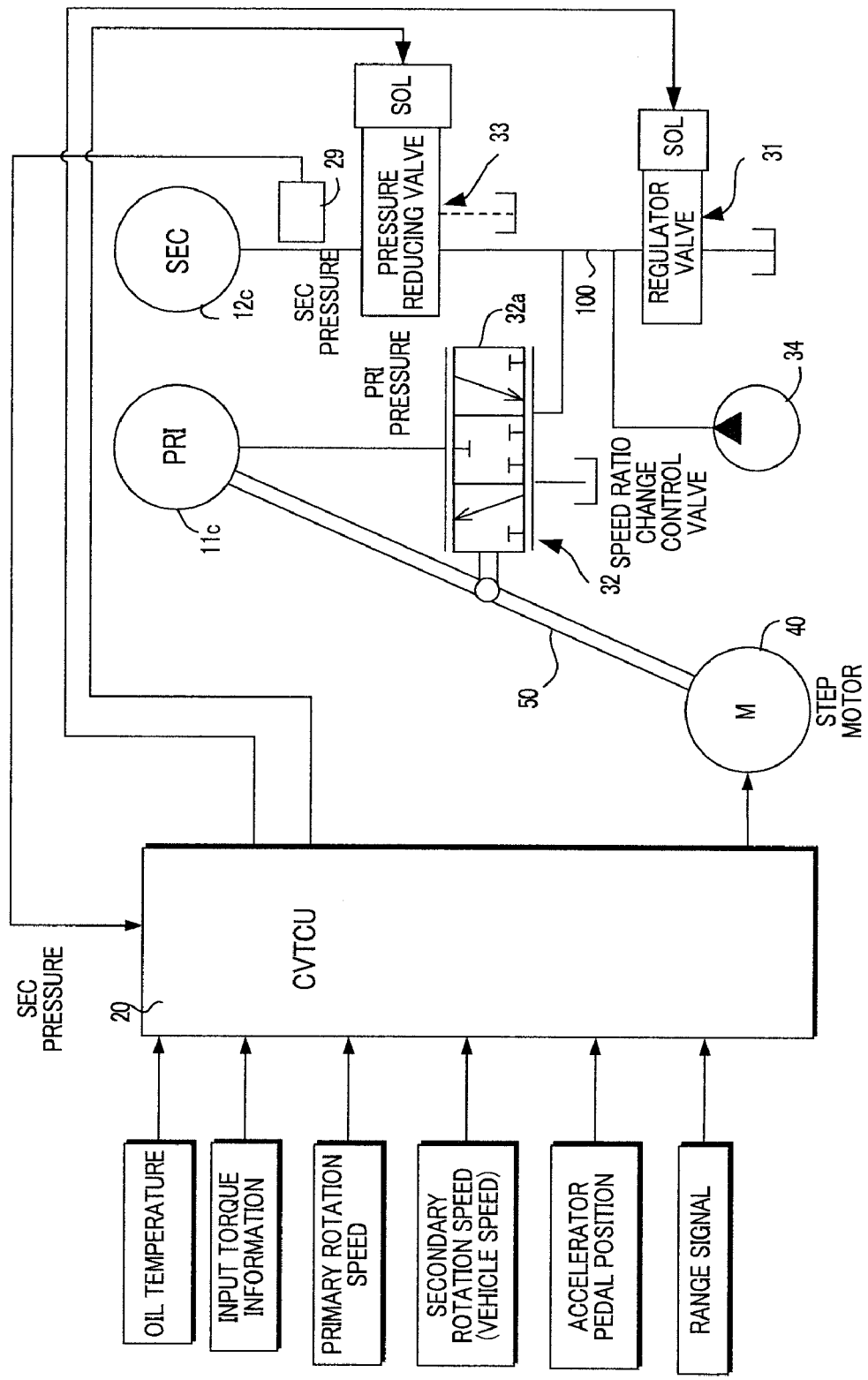
FIG. 2 is a schematic diagram of an oil pressure control unit and a CVTCU.

FIG. 2 is a schematic diagram of the oil pressure control unit and the CVTCU.

The oil pressure control unit 30 comprises a regulator valve 31, a speed ratio change control valve 32, and a pressure reducing valve 33. The oil pressure control unit 30 controls oil pressure supplied by a hydraulic pump 34, and supplies the oil pressure to the primary pulley 11 and secondary pulley 12.

The regulator valve 31 is a pressure regulating valve which comprises a solenoid and regulates the pressure of the oil pumped by the hydraulic pump 34 to a predetermined line pressure in accordance with a command (for example, a duty signal or the like) from the CVTCU 20.

The line pressure supplied by the hydraulic pump 34 and regulated by the regulator valve 31 is supplied to the speed ratio change control valve 32 and the pressure reducing valve 33, respectively.

The speed ratio change control valve 32 is a control valve that controls the oil pressure (primary pressure hereafter) in the primary pulley cylinder chamber 11c to a desired target pressure. The speed ratio change control valve 32 is connected to a servo link 50 constituting a mechanical feedback mechanism. The speed ratio change control valve 32 is driven by a step motor 40 connected to one end of the servo link 50, and receives feedback regarding the groove width, or in other words the actual speed ratio, from the movable conical plate 11a of the primary pulley 11, which is connected to the other end of the servo link 50. The speed ratio change control valve 32 regulates the primary pressure by supplying and discharging oil pressure to and from the primary pulley cylinder chamber 11c through displacement of a spool 32a, thereby realizing a target speed ratio which is indicated by a drive position of the step motor 40, and when the speed change is actually complete, the speed ratio change control valve 32 receives the displacement from the servo link 50 and holds the spool 32a in a closed position.

The pressure reducing valve 33 is a control valve which comprises a solenoid and controls pressure (secondary pressure hereafter) supplied to the secondary pulley cylinder chamber 12c to a desired target pressure.

The speed ratio of the primary pulley 11 and secondary pulley 12 is controlled by the step motor 40, which is driven in accordance with a speed change command signal from the CVTCU 20. The spool 32a of the speed ratio change control valve 32 is driven in accordance with the displacement of the servo link 50, which operates in conjunction with the step motor 40, and thus the line pressure supplied to the speed ratio change control valve 32 is regulated such that the primary pressure is supplied to the primary pulley 11. As a result, the groove width is variably controlled and set to a predetermined speed ratio.

The CVTCU 20 variably controls the speed ratio and the contact frictional force of the V belt 13 by reading a range signal from the inhibitor switch 23, an accelerator pedal position from the accelerator pedal position sensor 24, an oil temperature of the belt type continuously variable transmission 10 from the oil temperature sensor 25, signals from the primary pulley speed sensor 26, the secondary pulley speed sensor 27, an oil pressure sensor 29, and so on. It should be noted that the oil pressure sensor 29 is a sensor which detects the secondary pressure applied to the secondary pulley cylinder chamber 12c.

The CVTCU 20 determines an optimum speed ratio for the corresponding operating conditions in accordance with the vehicle speed, the accelerator pedal position, and so on. The CVTCU 20 then calculates an intermediate target speed ratio with respect to the ultimate speed ratio, and performs control to provide a shifting process from the current speed ratio to the ultimate speed ratio with a desired characteristic. The target speed ratio is set at a first order lag to the ultimate speed ratio, and the shift speed is adjusted by adjusting the time constant at this time as desired according to the operating conditions of the vehicle, the operating mode of the belt type continuously variable transmission 10, and so on. After performing feedforward compensation processing, feedback compensation processing, disturbance compensation processing, and the like on the target speed ratio, a final target speed ratio is determined. The final target speed ratio is then converted into a drive signal of the step motor 40, whereupon the step motor 40 is driven to shift the current speed ratio toward the target speed ratio.

Further, the CVTCU 20 determines a target line pressure value from input torque information, the speed ratio, and the oil temperature, performs line pressure control by driving the solenoid of the regulator valve 31, determines a target secondary pressure value, drives the solenoid of the pressure reducing valve 33 in accordance with the detected value of the oil pressure sensor 29 and a target value, and controls the secondary pressure through feedback control.

Figure 3:
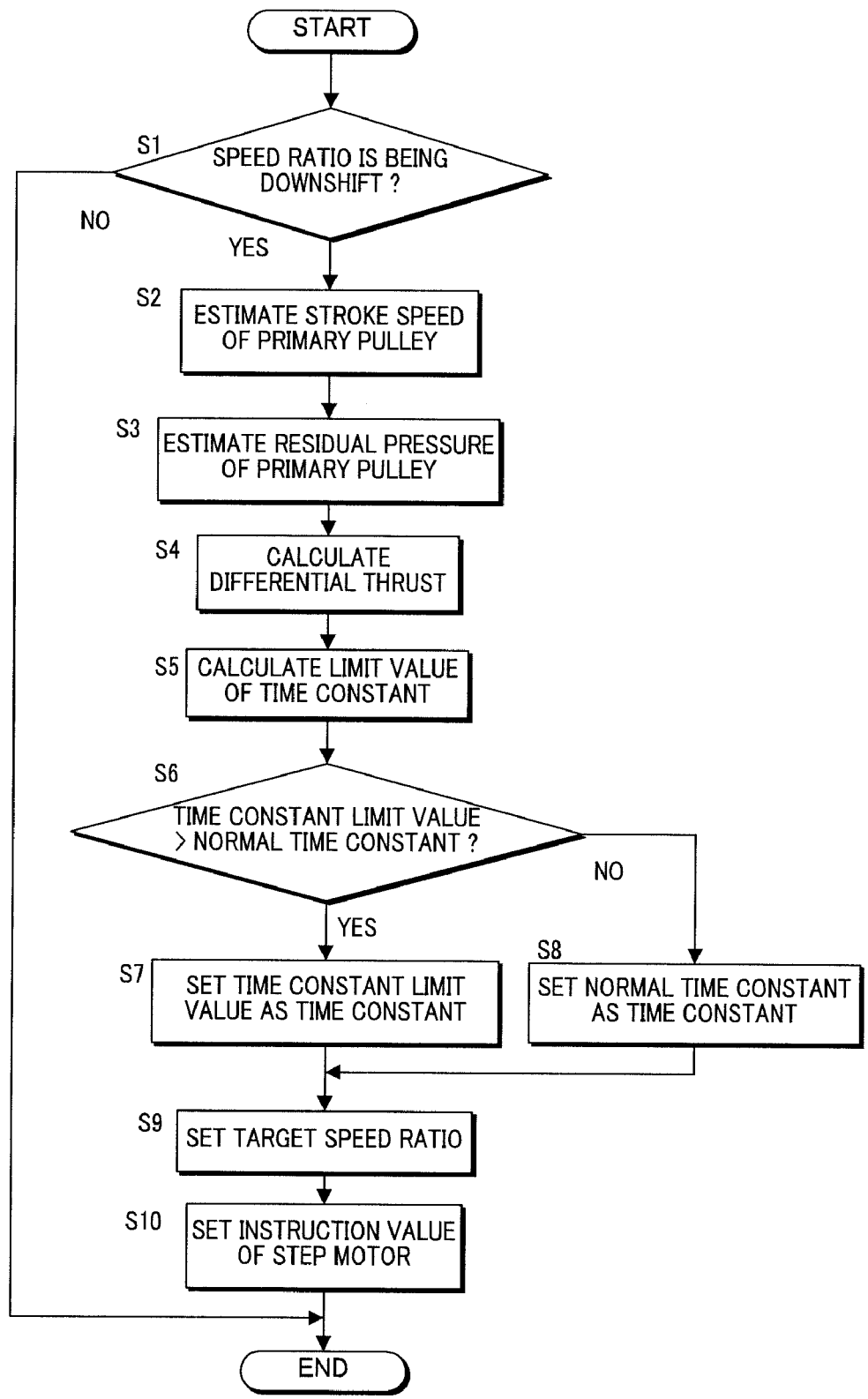
FIG. 3 is a flowchart showing the control of the speed ratio change control device for a belt type continuously variable transmission according to this embodiment.

The control performed by the CVTCU 20 will be described below with reference to the flowchart in FIG. 3. It should be noted that this control is performed repeatedly at very small time intervals (of 10 ms, for example).

In a step S1, a determination is made as to whether or not the speed ratio is currently being downshifted. If the speed ratio is being downshifted, the routine advances to a step S2, and if not, the processing is terminated. Here, it is determined that downshifting is underway when a deviation between the ultimate speed ratio and the target speed ratio is equal to or greater than a predetermined value.

In the step S2, a stroke speed of the primary pulley 11 is estimated. The stroke speed is calculated by integrating a magnification ratio of the stroke speed corresponding to a predetermined shift speed into the current shift speed.

In a step S3, the residual pressure of the primary pulley 11 is estimated. The residual pressure of the primary pulley 11 is a pressure determined on the basis of a flow generated in a drain side passage of the speed ratio change control valve 32 by the stroke of the primary pulley 11 and an opening of the drain side passage, and serves as a minimum value of the primary pressure that can be generated. It should be noted that in this embodiment, the opening of the drain side passage of the speed ratio change control valve 32 is fixed, and the residual pressure of the primary pulley 11 is estimated on the basis of the stroke speed of the primary pulley 11.

In a step S4, a differential thrust is calculated. The differential thrust is a value obtained by converting a differential pressure between a balance pressure, which is the primary pressure when the primary pressure and secondary pressure are balanced such that the speed ratio is in a state of equilibrium, and the residual pressure of the primary pulley 11 into thrust.

In a step S5, a limit value of the time constant is calculated on the basis of the differential thrust. Here, the time constant is a parameter used to determine the shift speed. As the time constant increases, the shift speed slows, and as the time constant decreases, the shift speed quickens. The time constant limit value is the time constant at a maximum shift speed that can be realized by the differential thrust calculated in the step S4. The time constant limit value is set steadily smaller as the differential thrust increases and the shift speed rises.

In a step S6, a determination is made as to whether or not the time constant limit value is larger than the normal time constant. When the time constant limit value is larger than the normal time constant, the routine advances to a step S7, where the time constant limit value is set as the time constant. When the time constant limit value is equal to or smaller than the normal time constant, the routine advances to a step S8, where the normal time constant is set as the time constant.

In a step S9, the target speed ratio is set on the basis of the time constant set in the step S7 or the step S8. Here, the target speed ratio is set at a maximum speed ratio that can be followed by the actual speed ratio when a speed change is performed at the time constant set in the step S7 or the step S8, or in other words the maximum currently realizable shift speed.

In a step S10, an instruction value of the step motor 40 is set on the basis of the target speed ratio.

Figure 4:
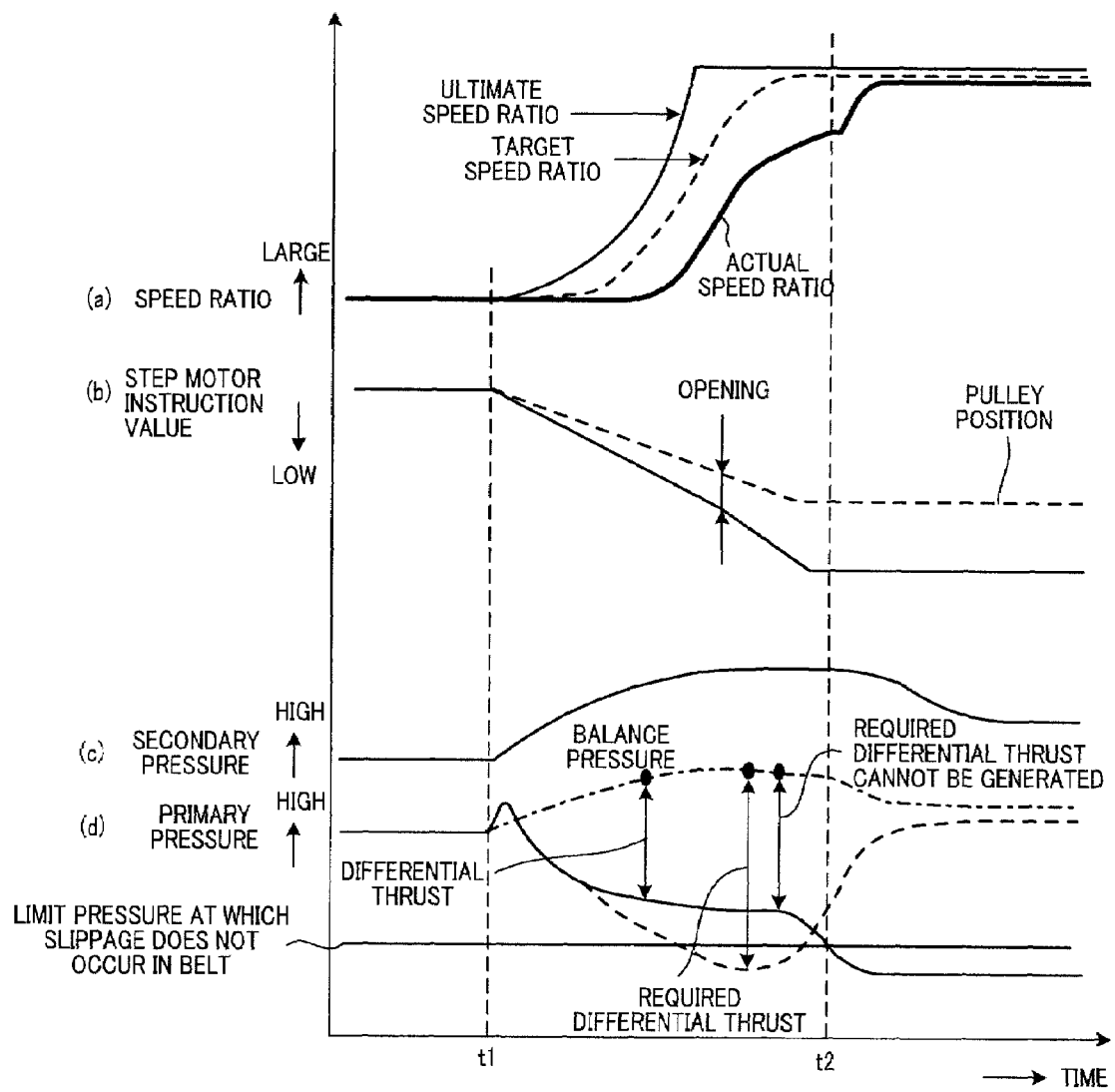
FIG. 4 is a time chart showing speed ratio change control according to a prior art example.
Figure 5:
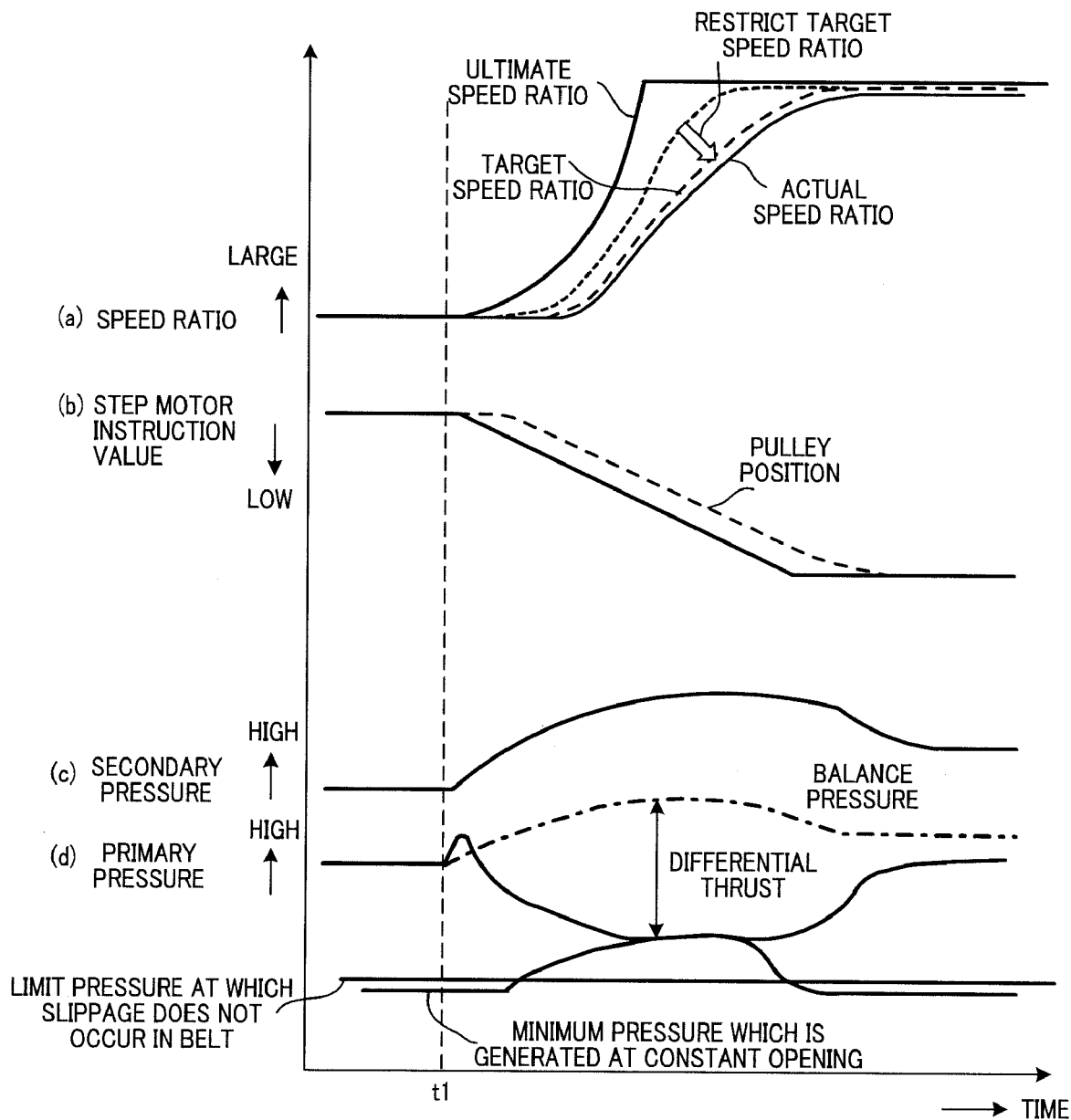
FIG. 5 is a time chart showing speed ratio change control according to this embodiment.

Next, the actions of this embodiment will be described using FIGS. 4 and 5. FIG. 4 is a time chart showing speed ratio change control according to a prior art example, in which (a), (b), (c) and (d) indicate the speed ratio, the step motor instruction value, the secondary pressure, and the primary pressure, respectively. FIG. 5 is a time chart showing the actions of the speed ratio change control device for a belt type continuously variable transmission according to this embodiment, in which (a), (b), (c) and (d) indicate the speed ratio, the step motor instruction value, the secondary pressure, and the primary pressure, respectively.

First, referring to FIG. 4, the prior art example will be described. FIG. 4 shows an example in which a vehicle exhibiting large speed ratio variation decelerates rapidly. At a time t1, the target speed ratio increases rapidly as the vehicle speed varies rapidly, and therefore, to shift the speed ratio to a Low side, the instruction value of the step motor 40 rapidly shifts to the Low side in accordance with the variation in the target speed ratio. Further, the step motor 40 is operated to open the drain side passage of the speed ratio change control valve 32, whereby the primary pressure decreases. Furthermore, the secondary pressure is raised by shifting the speed ratio to the Low side.

Here, the difference between the instruction value of the step motor 40 and the pulley position corresponds to the opening of the drain side passage of the speed ratio change control valve 32 such that the primary pressure decreases as the opening increases. However, there is a limit to the speed at which the primary pressure is discharged through the drain, and therefore the differential thrust required to make the actual speed ratio follow the target ratio cannot be generated.

As the deviation between the actual speed ratio and the target speed ratio increases, the feedback correction amount increases, and therefore the instruction value of the step motor 40 is shifted further to the Low side to increase the opening of the drain side passage. Eventually, the opening of the drain side passage reaches a maximum, and at a time t2, the primary pressure decreases rapidly, falling below a limit pressure at which slippage does not occur in the belt 13. As a result, belt slippage occurs.

Next, referring to FIG. 5, the actions of the speed ratio change control device for a belt type continuously variable transmission according to this embodiment will be described. Similarly to FIG. 4, FIG. 5 shows an example in which a vehicle exhibiting large speed ratio variation decelerates rapidly. At a time t1, the ultimate speed ratio varies greatly in accordance with the rapid variation in the vehicle speed. At this time, the differential thrust, i.e. the difference between the balance pressure and the primary pressure, is calculated, whereupon the realizable shift speed (time constant) is calculated from the differential thrust and the target speed ratio is determined from the shift speed (time constant). The step motor 40 is then driven in accordance with the determined target speed ratio.

Thus, the actual speed ratio can be caused to follow the target speed ratio, and therefore the feedback correction amount does not become excessive. As a result, a situation in which the primary pressure decreases rapidly so as to fall below the limit pressure at which slippage does not occur in the belt 13 can be prevented.

In the embodiment described above, the residual pressure of the primary pulley 11 is estimated on the basis of the displacement speed of the primary pulley 11 and the opening area of the drain side passage of the speed ratio change control valve 32, and the target speed ratio is set on the basis of a limit value of the shift speed (time constant) calculated on the basis of the residual pressure. Hence, when the speed ratio must be shifted quickly to the Low side during rapid deceleration of the vehicle or the like, for example, a situation in which the actual speed ratio cannot follow the target speed ratio can be prevented. As a result, the opening of the drain side passage does not increase excessively, and therefore rapid reductions in the primary pressure are suppressed such that belt slippage can be prevented.

Further, the upper limit value of the shift speed is set higher (the time constant is set smaller) as the difference between the balance pressure and the residual pressure of the primary pulley 11 increases, and therefore the realizable shift speed can be set appropriately on the basis of the differential thrust, and a situation in which the actual speed ratio cannot follow the target speed ratio can be prevented.

Moreover, the target speed ratio is set higher as the upper limit value of the shift speed increases, and therefore a situation in which the actual speed ratio cannot follow the target speed ratio can be prevented.

This application claims priority from Japanese Patent Application 2006-337958, filed Dec. 15, 2006, which is incorporated herein by reference in its entirety.

What is claimed is:

1. A speed ratio change control device for a belt type continuously variable transmission comprising:
    a continuously variable speed ratio change mechanism in which a belt is wrapped around a primary pulley and a secondary pulley and a speed ratio is varied by controlling a pressure supplied to each pulley to displace a movable sheave of each pulley;
    a speed ratio change control valve which controls a primary pressure serving as the pressure supplied to the primary pulley; and
    a link mechanism which moves the speed ratio change control valve to a position in which the primary pressure varies when a speed ratio change actuator moves to a position corresponding to a target speed ratio of the continuously variable speed ratio change mechanism, and returns the speed ratio change control valve to a position in which the primary pressure is maintained by varying the primary pressure such that the movable sheave of the primary pulley is displaced,
    the device comprising a controller which:
        estimates a minimum generated pressure of the primary pressure on the basis of a displacement speed of the movable sheave of the primary pulley and an opening area of a drain side passage of the speed ratio change control valve, which discharges the primary pressure;
        calculates an upper limit value of a shift speed of the continuously variable speed ratio change mechanism on the basis of the minimum generated pressure of the primary pressure; and
        sets the target speed ratio of the continuously variable speed ratio change mechanism on the basis of the upper limit value of the shift speed.

2. The speed ratio change control device as defined in claim 1, wherein the controller further sets the upper limit value of the shift speed of the continuously variable speed ratio change mechanism higher as a difference between the primary pressure when the speed ratio of the continuously variable speed ratio change mechanism is in a state of equilibrium and the minimum generated pressure of the primary pressure increases.

3. The speed ratio change control device as defined in claim 1, wherein the controller further sets the target speed ratio of the continuously variable speed ratio change mechanism higher as the upper limit value of the shift speed increases.

4. A speed ratio change control method for a belt type continuously variable transmission comprising:
    a continuously variable speed ratio change mechanism in which a belt is wrapped around a primary pulley and a secondary pulley and a speed ratio is varied by controlling a pressure supplied to each pulley to displace a movable sheave of each pulley;
    a speed ratio change control valve which controls a primary pressure serving as the pressure supplied to the primary pulley; and
    a link mechanism which moves the speed ratio change control valve to a position in which the primary pressure varies when a speed ratio change actuator moves to a position corresponding to a target speed ratio of the continuously variable speed ratio change mechanism, and returns the speed ratio change control valve to a position in which the primary pressure is maintained by varying the primary pressure such that the movable sheave of the primary pulley is displaced,
    the method comprising:
        estimating a minimum generated pressure of the primary pressure on the basis of a displacement speed of the movable sheave of the primary pulley and an opening area of a drain side passage of the speed ratio change control valve, which discharges the primary pressure;
        calculating an upper limit value of a shift speed of the continuously variable speed ratio change mechanism on the basis of the minimum generated pressure of the primary pressure; and
        setting the target speed ratio of the continuously variable speed ratio change mechanism on the basis of the upper limit value of the shift speed.

5. The speed ratio change control method as defined in claim 4, wherein the calculating action sets the upper limit value of the shift speed of the continuously variable speed ratio change mechanism higher as a difference between the primary pressure when the speed ratio of the continuously variable speed ratio change mechanism is in a state of equilibrium and the minimum generated pressure of the primary pressure increases.

6. The speed ratio change control method as defined in claim 4, wherein the setting sets the target speed ratio of the continuously variable speed ratio change mechanism higher as the upper limit value of the shift speed increases.

7. A speed ratio change control device for a belt type continuously variable transmission comprising:
    a continuously variable speed ratio change mechanism in which a belt is wrapped around a primary pulley and a secondary pulley and a speed ratio is varied by controlling a pressure supplied to each pulley to displace a movable sheave of each pulley;
    a speed ratio change control valve which controls a primary pressure serving as the pressure supplied to the primary pulley; and
    a link mechanism which moves the speed ratio change control valve to a position in which the primary pressure varies when a speed ratio change actuator moves to a position corresponding to a target speed ratio of the continuously variable speed ratio change mechanism, and returns the speed ratio change control valve to a position in which the primary pressure is maintained by varying the primary pressure such that the movable sheave of the primary pulley is displaced,
    the device comprising:
        minimum generated pressure estimating means for estimating a minimum generated pressure of the primary pressure on the basis of a displacement speed of the movable sheave of the primary pulley and an opening area of a drain side passage of the speed ratio change control valve, which discharges the primary pressure;
        shift speed upper limit value calculating means for calculating an upper limit value of a shift speed of the continuously variable speed ratio change mechanism on the basis of the minimum generated pressure of the primary pressure; and target speed ratio setting means for setting the target speed ratio of the continuously variable speed ratio change mechanism on the basis of the upper limit value of the shift speed.

8. The speed ratio change control device as defined in claim 7, wherein the shift speed upper limit value calculating means sets the upper limit value of the shift speed of the continuously variable speed ratio change mechanism higher as a difference between the primary pressure when the speed ratio of the continuously variable speed ratio change mechanism is in a state of equilibrium and the minimum generated pressure of the primary pressure increases.

9. The speed ratio change control device as defined in claim 7, wherein the target speed ratio setting means sets the target speed ratio of the continuously variable speed ratio change mechanism higher as the upper limit value of the shift speed increases.

* * * * *